United States Patent [19]

Rhodes et al.

[11] Patent Number: 5,022,945
[45] Date of Patent: Jun. 11, 1991

[54] METHOD FOR CONSTRUCTING ABSORBENT PAD

[75] Inventors: John C. Rhodes, Washington, Mo.; Ronald R. Aljoe, Lewisville, Tex.; Berne F. Ellers, Orkelljunga, Sweden

[73] Assignees: Clean-Pak, Inc., St. Louis, Mo.; Dry Forming Processes AB, Orkelljunga, Sweden

[21] Appl. No.: 481,637

[22] Filed: Feb. 20, 1990

Related U.S. Application Data

[62] Division of Ser. No. 246,155, Sep. 19, 1988, Pat. No. 4,940,621.

[51] Int. Cl.$^5$ .......................... B32B 31/06; B32B 31/18
[52] U.S. Cl. ...................................... 156/253; 156/276; 156/292; 156/308.4; 426/124; 426/129; 428/137; 428/192; 428/286
[58] Field of Search ...................... 156/276, 292, 308.4; 206/204; 426/124, 129; 428/137, 192, 283, 284, 286; 604/378–380, 368

[56] References Cited

U.S. PATENT DOCUMENTS

| | | | |
|---|---|---|---|
| 3,814,101 | 6/1974 | Kozak | 428/136 |
| 3,886,941 | 6/1975 | Duane et al. | 604/378 X |
| 4,605,401 | 8/1986 | Chmelir et al. | 604/368 |
| 4,865,596 | 9/1989 | Weisman et al. | 604/368 |

Primary Examiner—John J. Gallagher
Assistant Examiner—Nancy T. Krawczyk
Attorney, Agent, or Firm—Polster, Polster and Lucchesi

[57] ABSTRACT

An absorbent pad for meat and poultry products and the like and a method for constructing same is disclosed. The absorbent pad includes upper and lower plastic film layers, at least one of which is perforated, and an intermediate absorbent layer disposed between the layers. The intermediate absorbent layer includes a series of juxtaposed and overlapping absorbent material fibers with superabsorbent granules dispersed throughout the absorbent layer and supported by the absorbent material fibers within interstices thereof. The superabsorbent granules are capable of absorbing and suspending liquids therein while being retained and supported by the absorbent material fibers even when the absorbent material fibers have liquid therein. The upper and lower film layers are attached to one another at least partially along opposite marginal edge portions thereof to retain the absorbent layer between the upper and lower layers. The superabsorbent granular particles are homogeneously dispersed throughout the absorbent layer and supported in generally spaced relationship within the interstices of the absorbent material fibers, to enable suspension and retention of liquid by said superabsorbent granules and absorbent material fibers.

5 Claims, 2 Drawing Sheets

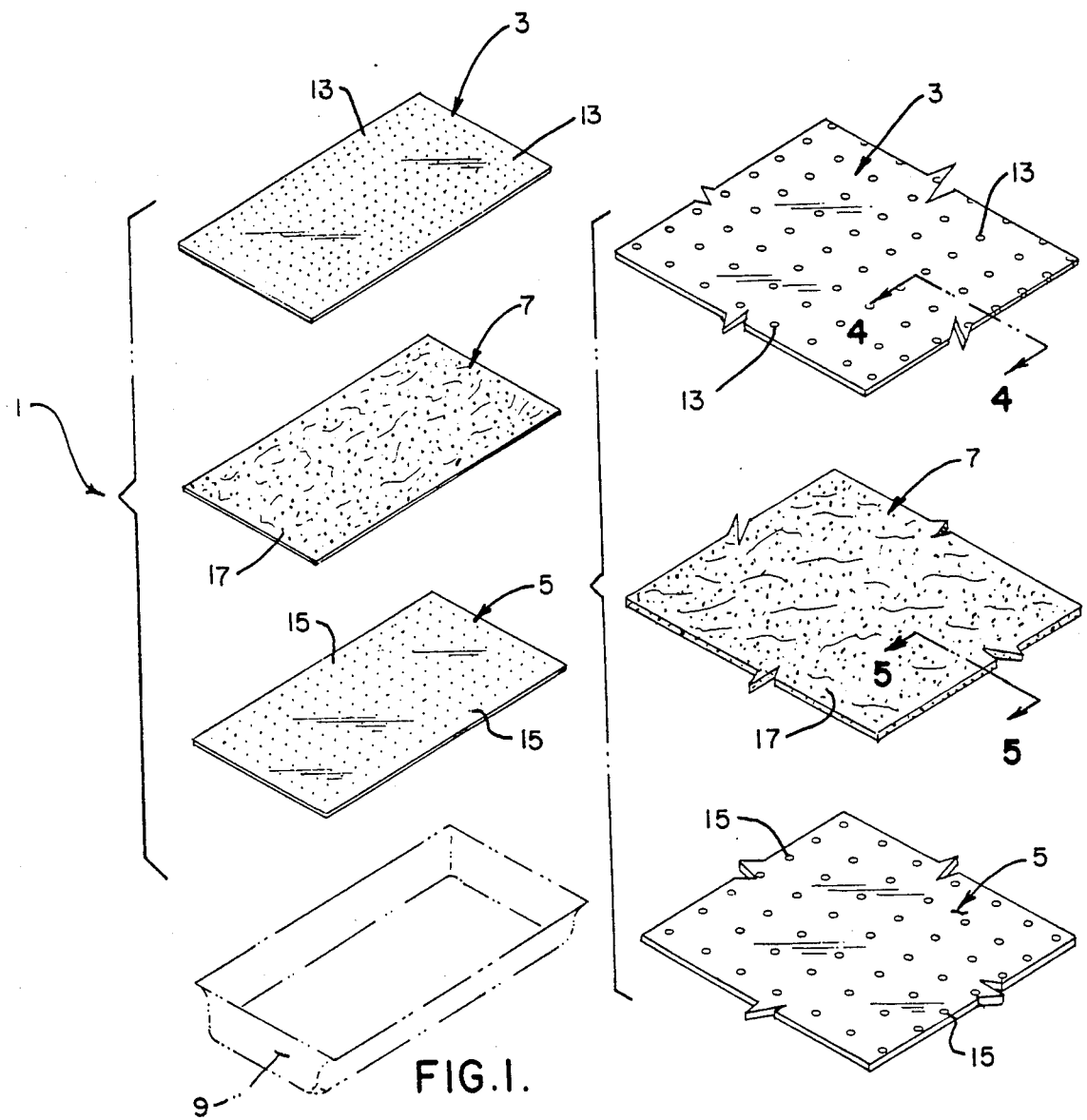
FIG. 1.
FIG. 2.
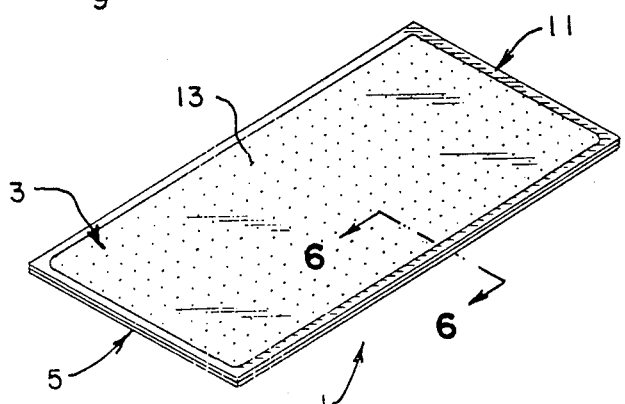
FIG. 3.
FIG. 3A.

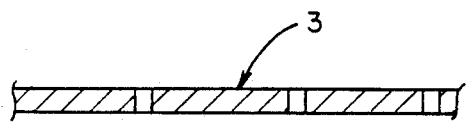
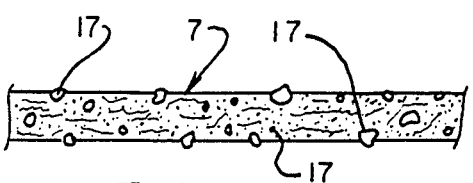
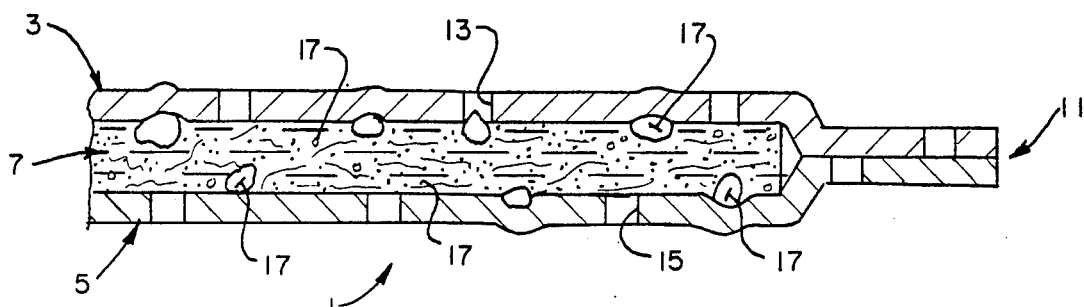
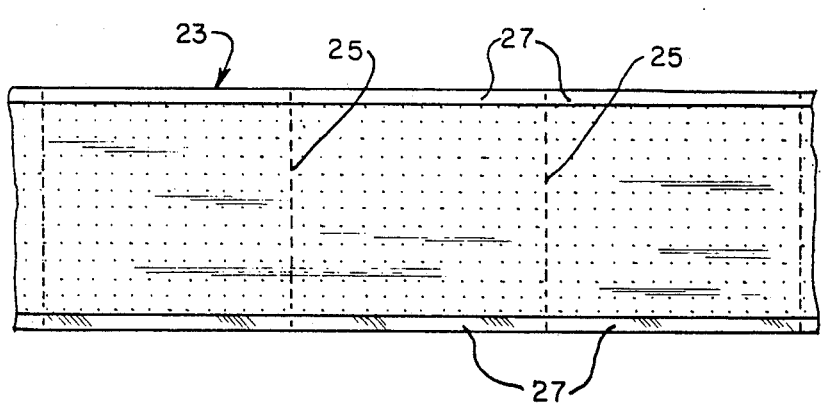
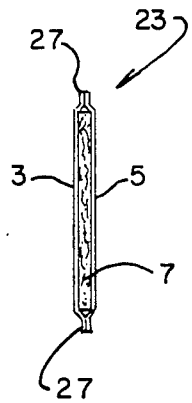
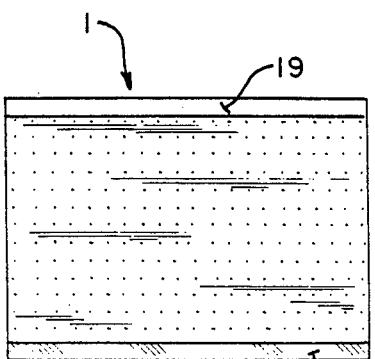
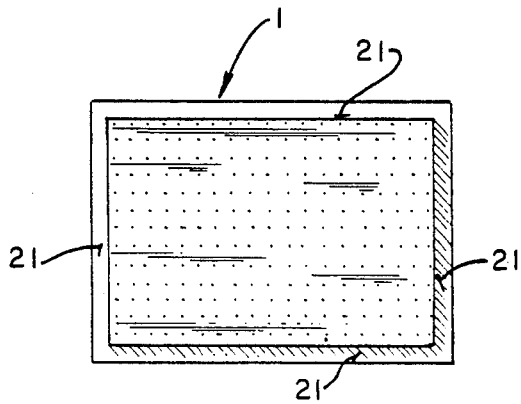

5,022,945

METHOD FOR CONSTRUCTING ABSORBENT PAD

This is a divisional of copending application Ser. No. 07/246,155, filed on Sept. 19, 1988, now U.S. Pat. No. 4,940,621.

BACKGROUND OF THE INVENTION

The present invention relates to an absorbent pad for meat and poultry products and the like, and to the method for constructing such absorbent pads. More particularly, the present invention relates to a new and improved absorbent pad incorporating superabsorbent granules therein, and to a method for constructing the same.

Meat and poultry food products are typically sold in a supporting tray that is overwrapped by a transparent plastic film or in transparent plastic bags, enabling viewing and inspection of the food products. The public has become accustomed to purchasing meat and poultry food products contained within such packages, not only because the products can be easily viewed and inspected, but also because consumers believe that the food products contained within such packages are maintained in a sterile environment. While it is true that supporting trays with transparent plastic overwrap and transparent plastic bags do, in fact, protect the food products from external contamination, consumers are not always aware of the potential for internal contamination, as the result of juices or liquids exuded from such food products. It has been found that juices or liquids exuded from such food products can support the rapid growth of bacteria which migrate back into and around the food products, resulting in spoilage or deterioration of food products. Furthermore, such exuded liquids or juices create an undesirable visual impression to a consumer, giving the consumer the impression that the food products are unappealing.

As a result, substantial developments have been made in an effort to overcome such problems. In general, these developments have centered around the use of an absorbent pad which is received in a supporting tray or bag and underlies food products in the supporting tray or bag. However, the problem is not so easily solved by providing an absorbent pad alone, because commonly used absorbent pads do not necessarily absorb all of such liquids or juices, and further, the meat or poultry product still come into contact with the juices or liquids absorbed by the absorbent pad. As a result, some absorbent pads have been developed with an imperforate plastic film or non-absorbtive barrier above the absorbent pad allowing side and bottom wicking of the exuded liquids and juices, while seeking to prevent reverse migration of the liquids or juices back into contact with the food products. An example of this is shown in U.S. Pat. No. 3,026,209. Some more recent developments have included the use of an absorbent pad sealed within upper and lower plastic films, and with one of the upper or lower films being perforated for top and/or bottom wicking of the exuded liquids or juices by the absorbent pad within the sealed upper and lower film layers. Examples of circumferential and peripherally sealed upper and lower plastic films containing an absorbent pad therein are shown by U.S. Pat. Nos. 4,275,811; 4,321,997; 4,382,507 and 4,410,578. In general, these patents teach that perforating only one film layer, referably the bottom film layer only, permits bottom wicking and retention of the exuded liquids or juices within the circumferentially sealed upper and lower film layers, without any reverse migration of the liquids or juices back into the food products.

While the aforementioned designs have worked quite well for their intended purposes, they have not solved all of the problems associated with exuded liquids or juices from meat and poultry products. Thus, where the bottom plastic film is perforated to allow for bottom wicking only, some liquids or juices remained trapped between the imperforate upper film layer and the food product, creating the potential for spoilage or discoloration. Even where both the upper and lower plastic film layers have been perforated to allow for both top and bottom wicking, the absorbent layer has not been sufficiently absorbent to retain the liquids or juices therein. Some of the prior art designs have even suggested various additives to the absorbent pad to increase its absorbency; however, in fact, none of the proposed additives have functioned well enough to absorb and retain the exuded liquids or juices within the absorbent pad. Where the absorbent pad has reached its maximum potential absorbency, no more liquids or juices can be absorbed, and this results in excess juices remaining outside of the absorbent pad for contact with the meat products and/or viewing by the consumer.

It has been observed that the absorbent pad, according to the U.S. Pat. Nos. 4,275,811, 4,321,997, 4,382,507 and 4,410,578, cannot sufficiently absorb and retain the juices from the meat products in certain applications. For example, if the absorbent pad is exposed to pressure, the juice will be squeezed out from the pad and onto the product. In U.S. Pat. No. 4,321,997, the absorbent pad is provided with a spacing means for preventing the squeezing out of the juices, recognizing that such problem exists.

According to the present invention, it has been observed that the inclusion of a superabsorbent material in the absorbent pad improves the retention properties of the absorbent pad so that it does not give off the absorbed liquid even when exposed to a pressure. Due to this property, it is now possible to enclose the absorbent pad within plastic sheets wherein the upper sheet is perforated. Thus, the risk that the juice is accumulated between the meat product and the upper sheet is avoided.

However, it is very important that the superabsorbent particles are evenly spaced within the absorbent pad and retained in place. According to the present invention, this object is achieved by including the superabsorbent particles in a network formed between cellulosic fibers and thermoplastic fibers (or other similar fibers), which are bonded in a thermobonding process. The superabsorbent particles are generally homogeneously dispersed or evenly spaced in the material and held in place by the interacting thermoplastic and cellulosic fibers. Thus, the superabsorbent particles, when absorbing liquid, are prevented from moving within the material. It is believed that this property is sufficient for preventing reverse migration of the juices back to the meat product, even when the upper sheet is perforated. In applications where higher demands are placed on the absorbent pad, it may be constructed with an imperforate upper sheet, but the sides thereof may still be unsealed so that the juices are absorbed through said sides.

SUMMARY OF THE INVENTION

Accordingly, among the several objects and advantages of the present invention include:

the provision of a new and improved absorbent pad for meat and poultry products which overcomes the aforenoted deficiencies of the prior art;

the provision of the aforementioned absorbent pad which includes a superabsorbent to absorb and hold liquids in suspension within the absorbent pads;

the provision of the aforementioned absorbent pad which is manufactured from man made or natural fabrics or combinations thereof, and which also absorbs liquids therein, while supporting and retaining the superabsorbent against movement;

the provision of the aforementioned absorbent pad in which the superabsorbent is generally homogeneously or uniformly applied throughout the absorbent layer to enable absorption and suspension of liquids by the superabsorbent and absorbing layer throughout;

the provision of the aforementioned absorbent pad which provides both top and/or bottom wicking and/or side wicking of liquids or juices therein, while retaining all liquids or juices within the absorbent pad;

the provision of a method for constructing an absorbent pad described above using well established manufacturing techniques with additional novel procedural steps to facilitate the manufacture of such absorbent pads; where such absorbent pads are be manufactured into individual components or in an elongated strip for separation into separate components or units; are relatively simple and easy to construct and manufacture, and are otherwise well adapted for the purposes intended.

Briefly stated, the absorbent pad for meat and poultry products and the like, according to the present invention, includes upper and lower plastic film layers, at least one of which has a plurality of perforations therethrough, and preferably where both have a plurality of perforations therethrough. An intermediate absorbent pad is positioned intermediate the upper and lower plastic film layers and includes a series of juxtaposed and overlapping absorbent material fibers which are constructed to provide a plurality of spaced interstices throughout the absorbent layer. Superabsorbent granular particles are dispersed throughout the absorbent layer and are supported at random locations by the absorbent material fibers within at least some of the interstices thereof. The superabsorbent granular particles are capable of absorbing and suspending liquid therein while being retained and supported by the absorbent material fibers which also absorb liquids therein. The upper and lower film layers are attached to one another at least partially along opposite marginal edge portions thereof to retain the absorbent layer between the upper and lower plastic film layers. If desired, the upper and lower film layers may be attached to one another throughout the entire marginal edge portions thereof.

The superabsorbent granular particles are homogeneously dispersed throughout the absorbent layer and supported in generally spaced relationship to one another within the spaced interstices of the juxtaposed and overlapping absorbent material fibers to enable suspension and retention of liquid by the superabsorbent granules and absorbent material fibers. The super absorbent granules may include carboxy-methyl-cellulose or an acrylic superabsorbent.

The upper and lower plastic film layers are preferably formed from polyethylene material while the absorbent material fibers of the absorbent layer are preferably made from cellulose and thermoplastic fibers. The absorbent material fibers may be made from man made or natural fibers or combinations thereof and may be of woven or non-woven material, but preferably have attached fibers. The absorbent material fibers generally comprise a series of juxtaposed and overlapping absorbent material fibers which are secured to one another to provide a plurality of interacting structurally supported fibers with spaced interstices therebetween throughout the absorbent layer.

The absorbent pad preferably has a generally rectangular shape defined by two opposing pairs of marginal edge portions, at least one of the two opposing pairs of marginal edge portions being sealed to one another. Alternatively, both of the opposing pairs of marginal edge portions may be sealed to one another to provide a circumferential seal around the entire absorbent pad.

The method of constructing an absorbent pad for meat and poultry products and the like includes the steps of: forming upper and lower plastic film layers at least one of which is perforated; positioning the film layers in spaced relationship to one another; forming a series of juxtaposed and overlapping absorbent material fibers with spaced interstices therein to provide an absorbent material layer; homogeneously dispersing superabsorbent granules throughout said absorbent layer for receipt within at least some of the spaced interstices thereof; positioning the absorbent layer between the upper and lower plastic film layers; moving the layers into assembled proximity to one another; and attaching marginal edges of the upper and lower layers at least partially along circumferential portions thereof to retain the absorbent layer therebetween.

The upper and lower film layers and the intermediate absorbent layer may be formed into an elongated absorbent pad strip, and the absorbent pad strip may be separated transversely thereof into discreet units each forming an individual absorbent pad. In forming the elongated absorbent pad strip, the upper and lower layers are attached to one another along opposite continuous marginal edge portions thereof. Following transverse separation of individual absorbent pads from the elongated pad strip, the upper and lower layers may be attached along opposite separated transverse edge portions in order to circumferentially seal the absorbent pad throughout the entire peripheral extent thereof. Alternatively, the upper and lower layers may be attached to one another both along opposite continuous marginal edge portions and along spaced transversely extending portions to form a series of absorbent pads within the absorbent pad strip, and with the absorbent pad strip being separated along the spaced transversely extending portions thereof to form individual absorbent pads. The transversely extending portions may also be perforated therealong to facilitate separation into individual absorbent pads.

Other objects and features of the present invention will become more readily apparent from the ensuing description.

BRIEF DESCRIPTION OF THE DRAWINGS

In the drawings, FIG. 1 is an exploded isometric view of the components or layers forming the absorbent pad of the present invention;

FIG. 2 is an enlarged isometric view of portions of each of the components or layers of the absorbent pad of the present invention;

FIG. 3 is an isometric view of an absorbent pad in assembled relationship and ready for use;

FIG. 3A is an isometric view of an absorbent pad positioned in a transparent plastic bag containing a poultry product;

FIG. 4 is a fragmentary sectional view of the upper film layer as viewed along lines 4—4 of FIG. 2;

FIG. 5 is an enlarged fragmentary perspective view of the intermediate absorbent layer as viewed along lines 5—5 of FIG. 2;

FIG. 6 is an enlarged fragmentary sectional view of the assembled absorbent pad as viewed along lines 6—6 of the FIG. 3;

FIG. 7 is a top plan view illustrating a series of absorbent pads formed in an elongated pad strip and with a series of perforations formed in the elongated pad strip to facilitate separation into individual absorbent pads;

FIG. 8 is a side elevational view of the elongated pad strip shown in FIG. 7;

FIG. 9 is a top plan view of an absorbent pad having only opposite marginal edge portions of the upper and lower film layers sealed to one another; and FIG. 10 is a top plan view of an absorbent pad having all marginal edge portions of the upper and lower film layer sealed to one another so as to circumferentially seal the absorbent layer within the upper and lower film layers.

Corresponding reference numerals will be used throughout the various figures of the drawings.

DESCRIPTION OF THE PREFERRED EMBODIMENT

Reference is now made to the drawings for a description of the absorbent pad for meat and poultry products and the like, together with the method for constructing same. In the discussion that is to follow, it will be understood that the purpose of the absorbent pad is to absorb fluids or liquids that are exuded from processed meat such as meat and poultry products. In addition, the absorbent pad may be used in other markets, for example, where contaminated human and animal blood shipments may require an absorbent pad in shipment.

The absorbent pad is generally identified in FIGS. 1-3 by the numeral 1 and includes upper and lower plastic film layers 3-5 and intermediate absorbent layer 7. As illustrated in the drawings, the absorbent pad 1 is preferably of rectangular shape so as to be positioned along or supported by at least part of the bottom wall of a rectangular-shaped supporting tray 9 shown in dotted lines in FIG. 1 of the drawings, or along one side of a transparent plastic bag 10 containing a poultry product P, for example, as shown in FIG. 3A of the drawings. When the upper and lower film layers 3, 5 and intermediate absorbent layer 7 are assembled to one another, the marginal edge portions 11 of the upper and lower film layers are attached to one another, through the use of heat and/or pressure, to circumferentially attach and seal the upper and lower film layers 3, 5 to one another, as best seen in FIGS. 3 and 6 of the drawings. For some products, it may be necessary to seal only opposite marginal edge portions of the upper and lower film layers in the absorbent pad 1, as will be discussed hereafter. In lieu of heat and/or pressure sealing, hot melts or cold adhesives may be used to seal the marginal edge portions of the upper and lower film layers or sheets 3, 5.

As shown in FIGS. 1 and 2 of the drawings, both of the upper and lower plastic film sheets 3, 5 are provided with a series of perforations or openings scattered across the surface thereof in a predetermined pattern, as may be desired. In the upper layer 3, perforations 13 are provided, and in the lower film layer 5, perforations 15 are shown. In the preferred embodiment of the invention, both of the upper and lower plastic film layers 3, 5 are perforated in order to provide both top and bottom wicking of the absorbent layer 7, as will become apparent. The upper and lower plastic film layers are preferably both made from polyethylene material, enabling either the upper or lower film layer 3, 5 to also serve as a hydrophobic barrier to processed meat with respect to reverse migration of liquids from within the absorbent layer 7. The perforations 13 in the upper layer and perforations 15 in the lower layer will allow liquids to pass therethrough, over a predetermined time period, such that liquids will not overfill the absorbent layer 7. To function as intended, it is important that the components of the present invention absorb and hold fluids and liquids therein, as will become apparent.

For sealing the marginal edges of the upper and lower film 3, 5 to one another along marginal edge portions, polyethylene works quite well for this purpose, through the use of heat and pressure to seal and bond marginal edge portions of the upper and lower film layers together, as shown, for example, in FIG. 6 of the drawings at 11. Again, hot melts or cold adhesives may be employed as discussed above.

Attention is now directed to the intermediate absorbent layer 7 best shown in FIGS. 1-2 and 5-6 of the drawings. The absorbent pad may be constructed from man made or natural fibers or a combination thereof, either woven or non-woven, which are secured or attached to one another. Preferably, the absorbent material fibers of the absorbent pad are formed from cellulose and thermoplastic fibers (i.e., polyethylene) that are non-woven and attached to one another. Preferably, the cellulose and thermoplastic fibers are juxtaposed and overlapped or superimposed relative to one another and compressed sufficiently to maintain their relative consistency or integrity during manufacturing operations. More specifically, the juxtaposed and overlapping absorbent material fibers are secured to one another as a plurality of interacting, structurally supported fibers having spaced interstices therebetween, for purposes which will become apparent.

Whatever absorbent material fibers are chosen, it is important that they not only absorb fluids and liquids therein, but also are capable of supporting superabsorbent granule particles generally designated 17 in the drawings which are dispersed throughout the absorbent layer 7.

As will be appreciated, juxtaposed and overlapping absorbent material fibers will have interstices or cells therebetween, which may be enlarged by the flexing of the material fibers, to receive the superabsorbent granular particles 17 dispersed within at least some of the interstices, between juxtaposed and overlapping material fibers.

The superabsorbent granular particles 17 are homogeneously dispersed throughout the absorbent layer 7, either as the juxtaposed and overlapping material fibers of the absorbent layer 7 are brought into assembled relationship to one another or subsequently in the formation of the absorbent layer 7, such as by uniformly dusting or spreading the superabsorbent granules 17 throughout the absorbent layer.

It will be noted from FIGS. 5-6 of the drawings that the superabsorbent granules 17 are generally homogeneously or uniformly dispersed throughout the absorbent layer 7 including within the absorbent layer 7 as well as on the outer surfaces thereof. The superabsorbent granular particles 17 are also shown as being of different sizes throughout the absorbent layer 7, requiring the interstices between juxtaposed and overlapping material fibers to expand or enlarge, in some cases, to accommodate the various sizes of superabsorbent granular particles 17, as will be appreciated.

The superabsorbent granular particles 17 are capable of absorbing and suspending fluids and liquids therein, while being retained and supported by the absorbent material fibers of the absorbent layers 7. This is important in order to enable the superabsorbent granular particles 17 to absorb fluids and liquids and hold them in suspension in spaced or random locations throughout the absorbent layer 7. As compared with prior art products, the superabsorbent granular particles 17, together with the absorbent material fibers, substantially increase the fluid or liquid retention of the absorbent pad 1 of the present invention. This permits both the upper and lower film layers to be perforated, allowing both top and bottom wicking of the intermediate absorbent layer 7, which absorbs and suspends fluids and liquids therein. Thus, little or no reverse migration of the fluids or liquids back into contact with the processed meat products will be permitted since the absorbent material fibers of the absorbent layer 7, together with the superabsorbent granular particles 17, retain all or substantially all of the fluid or liquid product therein.

It has been discovered that by dispersing superabsorbent particles 17 within at least some of the interstices of the juxtaposed and overlapping absorbent material fibers, the superabsorbent particles 17 will absorb liquid while being held in place by material fibers that also absorb liquid, as well. The result is substantially greater liquid retention than prior art devices, while preventing reverse migration of the juices back into contact with the meat or poultry product, even when exposed to pressure from the weight of the product. As a result, it is possible to enclose the absorbent pad within upper and lower plastic films where both the sheets are perforated, thereby avoiding the risk that juice is accumulated between the meat or poultry product and the upper sheet. The absorbent pad may be used in other applications where top and/or bottom and/or side wicking or capillary attraction is desired, as discussed herein.

The superabsorbent granular particles 17 are selected from chemical compounds that have a liquid superabsorption capability. Some chemical compounds that have been found particularly effective for this purpose include a carboxy-methyl-cellulose superabsorbent compound and an acrylic superabsorbent (acrylic acid and sodium acrylate copolymer) compound. Both of these chemical compounds are USDA/FDA approved or approvable chemical compounds that can be used in connection with processed meat products. Other superabsorbent chemical compounds that can be used as suspended granular particles 17 within the absorbent layer 7 may be used, as desired.

In addition to top and bottom wicking through the upper and lower film layers 3, 5, an absorbent pad 1 may be constructed as shown in FIG. 9 of the drawings wherein the upper and lower film layers along opposite marginal ledges 19, 19 may be sealed together, leaving an exposed pair of side or end marginal edges. This will enable liquids or fluids to enter the intermediate absorbent layer 7 through side wicking or capillary action, as will be apparent. FIG. 10 illustrates an embodiment similar to FIG. 3 of the drawings where all four marginal edges 21 of the absorbent pad 1 have the upper and lower film layers sealed to provide a circumferentially sealed absorbent pad 1 containing the intermediate absorbent layer 7 therein.

The method of constructing an absorbent pad 1 will become apparent by referring to FIGS. 1-2 and 7-8 of the drawings. The method steps include forming upper and lower plastic film layers, at least one of which is perforated as is shown in FIGS. 1-2 of the drawings, the upper and lower film layers 3, 5 must be positioned in a spaced relationship to one another prior to assembly, as also shown in FIGS. 1-2. The intermediate absorbent material layer 7 may be formed by a series of juxtaposed and overlapping absorbent material fibers with spaced interstices therein, as described above, and with super-absorbent granular particles homogeneously dispersed throughout, for receipt within at least some of the spaced interstices. The manner of forming the intermediate absorbent material layer 7 and homogeneously dispersing the superabsorbent granular particles 17 has also been discussed above. When so constructed, the absorbent material layers 7 is then positioned between the upper and lower film layers 3, 5 as shown in FIGS. 1-2 of the drawings, and the layers are moved into assembled proximity to one another, to enable marginal edges of the upper and lower layers 3, 5 at least partially along circumferential portions thereof to be attached, for retaining the absorbent layer 7 therebetween. As shown in FIG. 7 of the drawings, the layers 3, 5 and 7 may be formed into an elongated absorbent pad strip 23 which is provided with a series of perforations 25 extending transversely across the strip to enable individual absorbent pads 1 to be formed. Alternatively, the strip 23 may be cut at various predetermined locations by a user. As shown in FIGS. 7 of the drawings, the upper and lower film layers be attached to one another along opposite continual marginal edge portions 27 during the assembly process, and following separation of the elongated absorbent pad strip 23 into discrete absorbent pads 1, each absorbent pad 1 may be provided with opposed attached or sealed marginal edges 19, 19 as in the FIG. 9 embodiment, or may be additionally sealed across the transverse separated or perforated portions to provide all four edges sealed as at 21 in FIG. 10 of the drawings. In the assembly process, the elongated absorbent pad strip 23 may be attached to one another both along opposite continuous marginal edge portions 27 and also along spaced transversely extending portions, as in the vicinity of the perforations 25, such that upon separating individual absorbent pads 1 from the elongated absorbent pad strip 23, the absorbent pads 1 will already be formed in the circumferentially sealed embodiment between four sealed edges 21 as shown in FIG. 10 of the drawings. In such a case, the perforations 25 extend along and separate the transversely sealed portions of the elongated absorbent pad strip, enabling individual absorbent pads 1 to be formed thereby.

From the foregoing, it will be appreciated that juices or liquids from a product resting on the absorbent pad 1 will pass through the perforations 13, 15 in the upper and lower film layers 3, 5 to provide top and/or bottom wicking of the absorbent pad 1 as desired. The capillary action or the absorbent material fibers and the superabsorbent granular particles 17 in the absorbent layer 7 tend to draw the liquids or juices into the absorbent layer 7, including the superabsorbent granular particles 17, where they are absorbed and suspended therein, out of contact with the food product. The superabsorbent granular particles 17 are supported within interstices between juxtaposed and overlapping absorbent material fibers extending throughout the absorbent layers 7, and together with the absorbent material fibers, the super absorbent granular particles 17 will substantially increase the fluid or liquid retention of the absorbent pad 1. As a result, there will be little or no reverse migration of the fluids or liquids back into contact with meat product, even where perforations 13 are provided in the upper film layer 3. In some cases, where side picking is desired, the embodiment shown in FIG. 9 may be used where only two opposite marginal edges of the absorbent pad 1 are sealed; in other instances, circumferential sealing of all of the marginal edge portions of the absorbent pad, as shown in FIG. 10 of the drawings, may be used in the desired absorbent pad 1 to be constructed.

According to the present invention the absorbent pad and the method of constructing same provides few and improved results and procedural steps, not heretofore contemplated. It will thus be seen that the several objects and features of this invention are achieved and other advantage results attained.

As various changes could be made in the above constructions and methods without departing from the scope of the invention, it is intended that all matter contained in the above description or shown in the accompanying drawings shall be interpreted as illustrative and not in a limiting sense.

We claim:

1. The method of constructing an absorbent pad for meat and poultry products and the like, comprising the steps of:
   forming upper and lower plastic film layers at least one of which is perforated,
   positioning said film layers in spaced relationship to one another;
   forming an absorbent material layer with a series of juxtaposed and overlapping absorbent material fibers which are secured to adjacent absorbent material fibers to provide a plurality of interacting structurally supported fibers with spaced interstices therethrough;
   homogeneously dispersing superabsorbent granules throughout said absorbent layer;
   supporting and physically retaining said superabsorbent granules in place against movement within said absorbent material layer by said interacting structurally supported fibers of said absorbent layer;
   positioning the thus constructed absorbent layer between said upper and lower film layers;
   moving said layers into assembled proximity to one another; and
   attaching marginal edges of said upper and lower layers at least partially along circumferential portions thereof to retain said absorbent layer therebetween.

2. The method as defined in claim 1 wherein each of said layers are formed into an elongated absorbent pad strip, and separating said absorbent pad strip transversely of said strip into discrete units each forming an individual absorbent pad.

3. The method as defined in claim 2 wherein said upper and lower layers are attached to one another along opposite continuous marginal edge portions during an assembly process, and following separation of said absorbent pad into discrete absorbent pads transversely of said elongated absorbent pad strip, attaching said upper and lower layers along opposite separated transverse edge portions for circumferentially attaching each absorbent pad throughout the entire peripheral extent thereof.

4. The method as defined in claim 2 wherein said upper and lower layers are attached to one both along opposite continuous marginal edge portions and along spaced transversely extending portions of said absorbent pad strip, and separating said absorbent pad strip along said spaced transversely extending portions to form said individual absorbent pads.

5. The method as defined in claim 4 wherein said spaced transversely extending portions are also perforated therealong to facilitate separation into individual absorbent pads which are circumferentially sealed along all peripheral edges thereof.

* * * * *